Sept. 22, 1953     F. MARTINDELL     2,653,307

ALTITUDE CONTROL SYSTEM

Filed March 23, 1949     5 Sheets-Sheet 1

INVENTOR
FRANK MARTINDELL
BY *Emery Robinson*
ATTORNEY

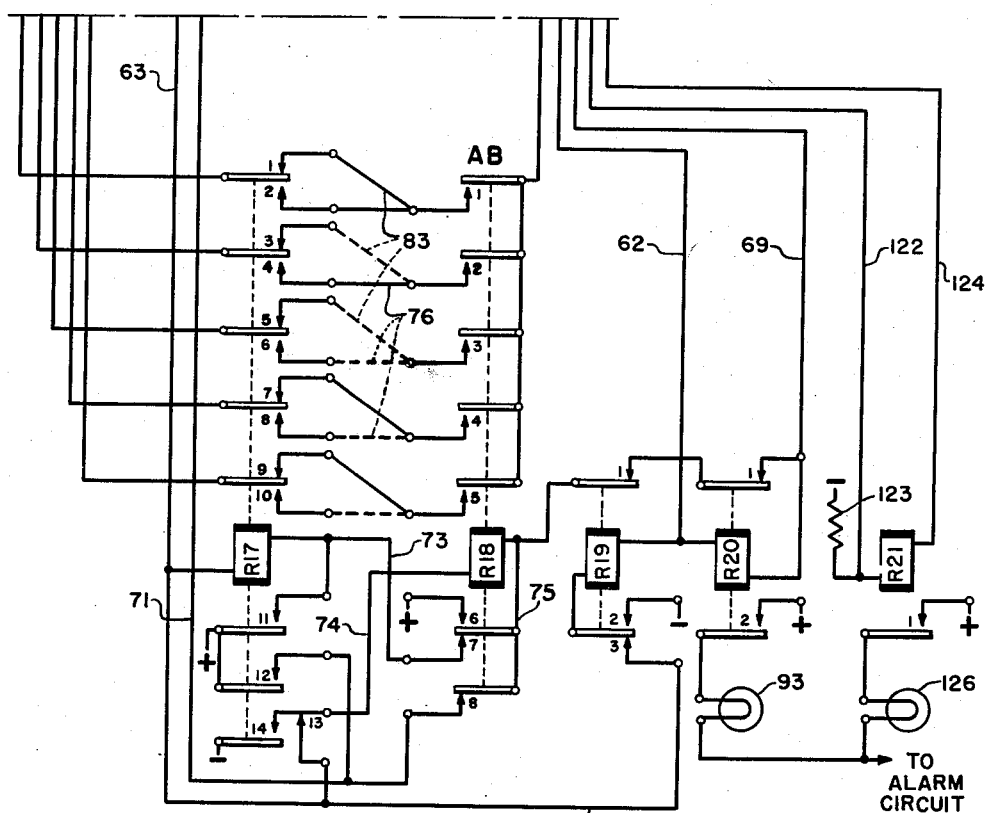

Sept. 22, 1953  F. MARTINDELL  2,653,307
ALTITUDE CONTROL SYSTEM
Filed March 23, 1949  5 Sheets-Sheet 4

INVENTOR
FRANK MARTINDELL
BY Emery Robinson
ATTORNEY

Sept. 22, 1953  F. MARTINDELL  2,653,307
ALTITUDE CONTROL SYSTEM
Filed March 23, 1949  5 Sheets-Sheet 5

INVENTOR
FRANK MARTINDELL
ATTORNEY

Patented Sept. 22, 1953

2,653,307

UNITED STATES PATENT OFFICE 2,653,307

ALTITUDE CONTROL SYSTEM

Frank Martindell, Western Springs, Ill., assignor to Teletype Corporation, Chicago, Ill., a corporation of Delaware Application March 23, 1949, Serial No. 83,000

11 Claims. (Cl. 340—23)

This invention relates to aircraft control systems and more particularly to systems for indicating and controlling the altitudes of a plurality of aircraft.

The present invention is designed particularly for use in situations where a control center takes over the control of an airplane when it reaches a certain distance from its destination and thereafter when the airplane gets closer to the landing field the control center relinquishes control of the airplane to the control tower which supervises the landing of the plane.

The present system consists generally of two units at the control center and two units at the airport control tower.

The two units at the center are similar in design and function to the two units at the tower. The first of each set of units is a push button and light panel located at an operator's position. The second unit of each set consists of a selective control unit of the type shown in the copending application of W. J. Zenner, Serial No. 739,747, filed April 7, 1947, now Patent No. 2,568,264, dated September 18, 1951, together with its associated relays and signal transmitting mechanism. The disclosure of this Zenner patent is hereby incorporated by reference into the present disclosure and should be referred to for a complete understanding of the selective control units.

The push button and light panel, or indicator unit at the center and tower consists, at each 1000 foot level, of a button to assign an airplane to that particular level, a button to cancel the assignment, and associated red and green indicator lights.

Upon the approach of an airplane to a landing field, at some point midway between the points of departure and destination, the control of the airplane's flight is taken over by a traffic center. The traffic center contacts the plane by radio and posts data covering the airline, flight number, expected time of arrival, etc. on a control board in a slot opposite the level at which the plane is flying. When the plane arrives within a certain distance from the landing field, the traffic center operator assigns it a level by radio, and at the same time depresses an assign button associated with the level in question. Depression of this assign button causes the corresponding green light to illuminate at the center board and the corresponding red light to illuminate at the tower board.

When the airplane approaches close enough to the landing field to come under the direction of the tower, the tower operator calls the plane to advise it whether or not it is to wait or to make an immediate landing. At this time the tower operator depresses the assign button corresponding to the level at which the plane is flying to transfer the control of the plane from the center to the tower. This transfer is indicated by a change in the arrangement of the lights; the green light at the center being extinguished and simultaneously therewith the corresponding red light being illuminated, the red light at the tower being extinguished and the corresponding green light being illuminated. Whenever a red light is displayed for a particular level on the center panel it indicates that control over an airplane flying at that level is in the hands of the tower, and when a red light is displayed for a particular level on the tower board the tower operator knows that the center controls an airplane flying at that level.

The tower, having obtained control over the airplane, then proceeds to assign successively lower levels to the plane as it descends until it lands. As the plane leaves a particular level and enters a new one, the tower operator cancels the assignment for the old level thereby extinguishing lights on both boards for that level, and at the same time assigns new levels thereby causing the illumination of the red light at the center and green light at the tower corresponding to the new levels.

The principal object of the invention is therefore to provide an aircraft altitude control system which is simple to operate and which at all times informs the control center operator and control tower operator whether or not an airplane is assigned to a particular altitude and if assigned, which control office has control of the airplane.

Another object of the invention is to provide an aircraft altitude control system whereby the display of an illuminated red light on a control panel indicates that the particular level is occupied by an airplane which is under the control of a different control office whereas the display of an illuminated green light on a control panel indicates that the particular level is occupied by an airplane which is under the control of the office in which the control panel is located.

Another object of the invention is to provide an aircraft altitude control system wherein the assignment of a level to an airplane can only be canceled by the control office having control of the airplane.

These objects and others will be apparent and the invention will be understood more readily from the following detailed description when read in conjunction with the accompanying drawings wherein Figs. 1-4 are schematic circuit diagrams showing the system as contemplated by the invention;

Figure 1:
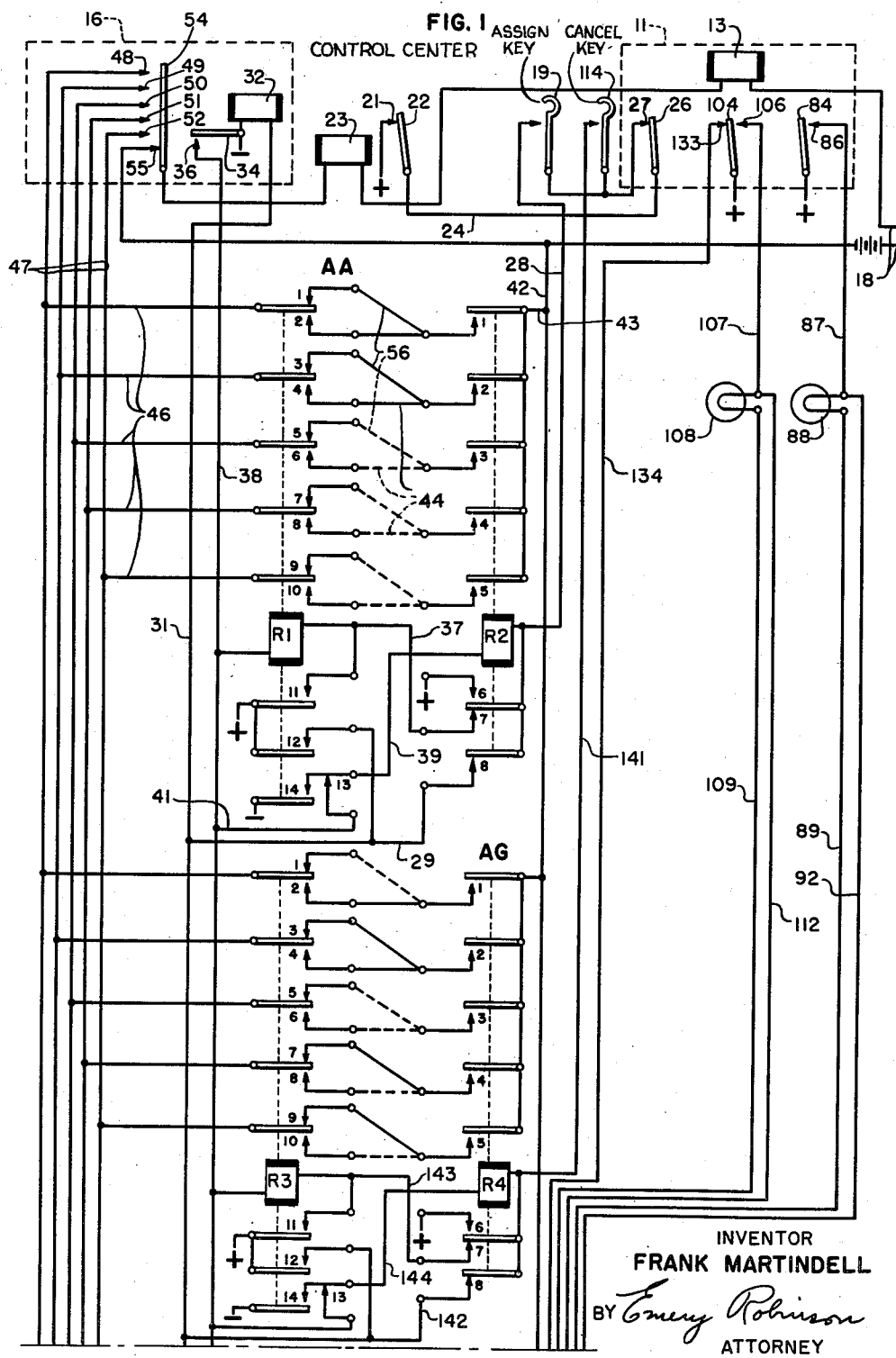
Figure 2:
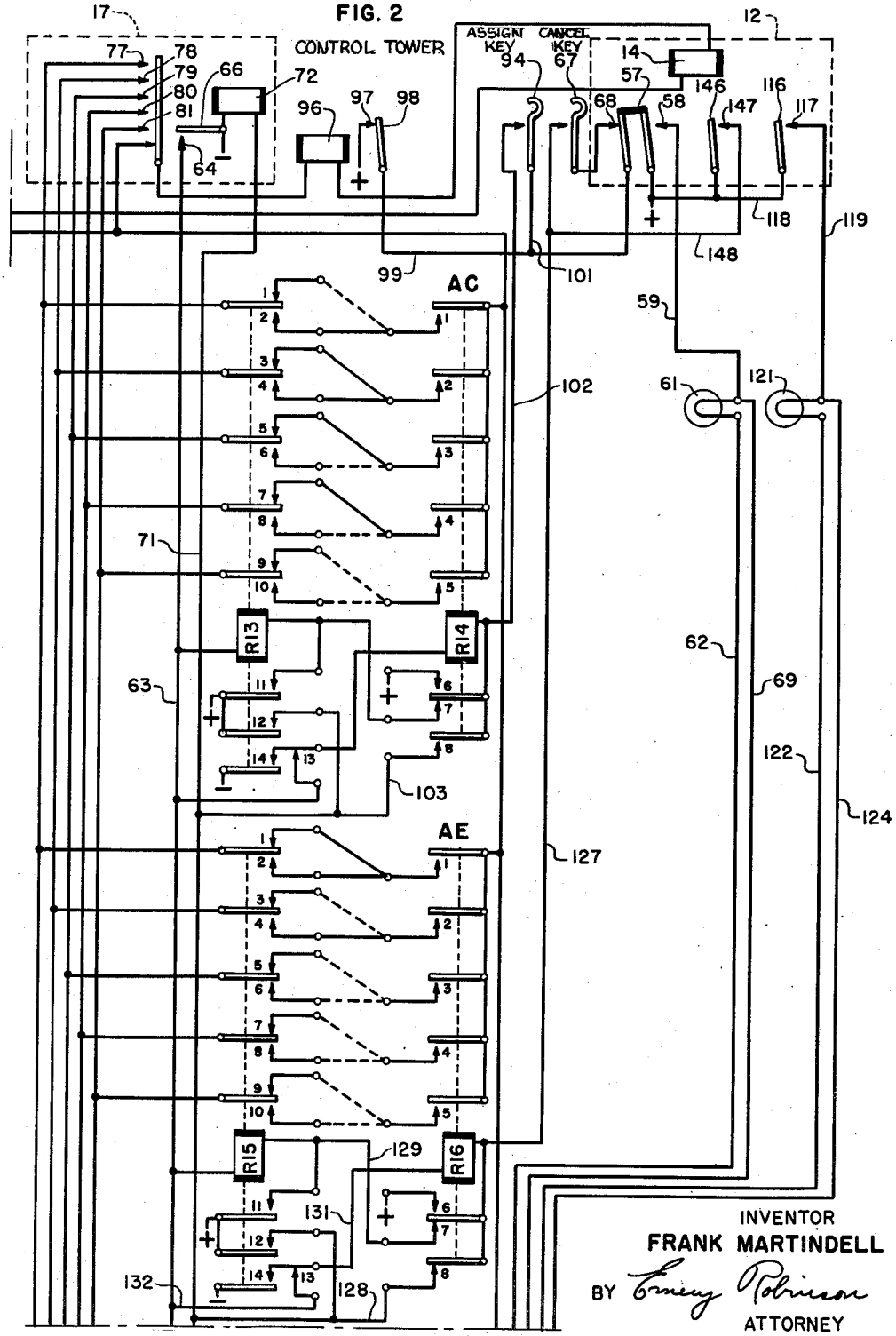
Figure 3:
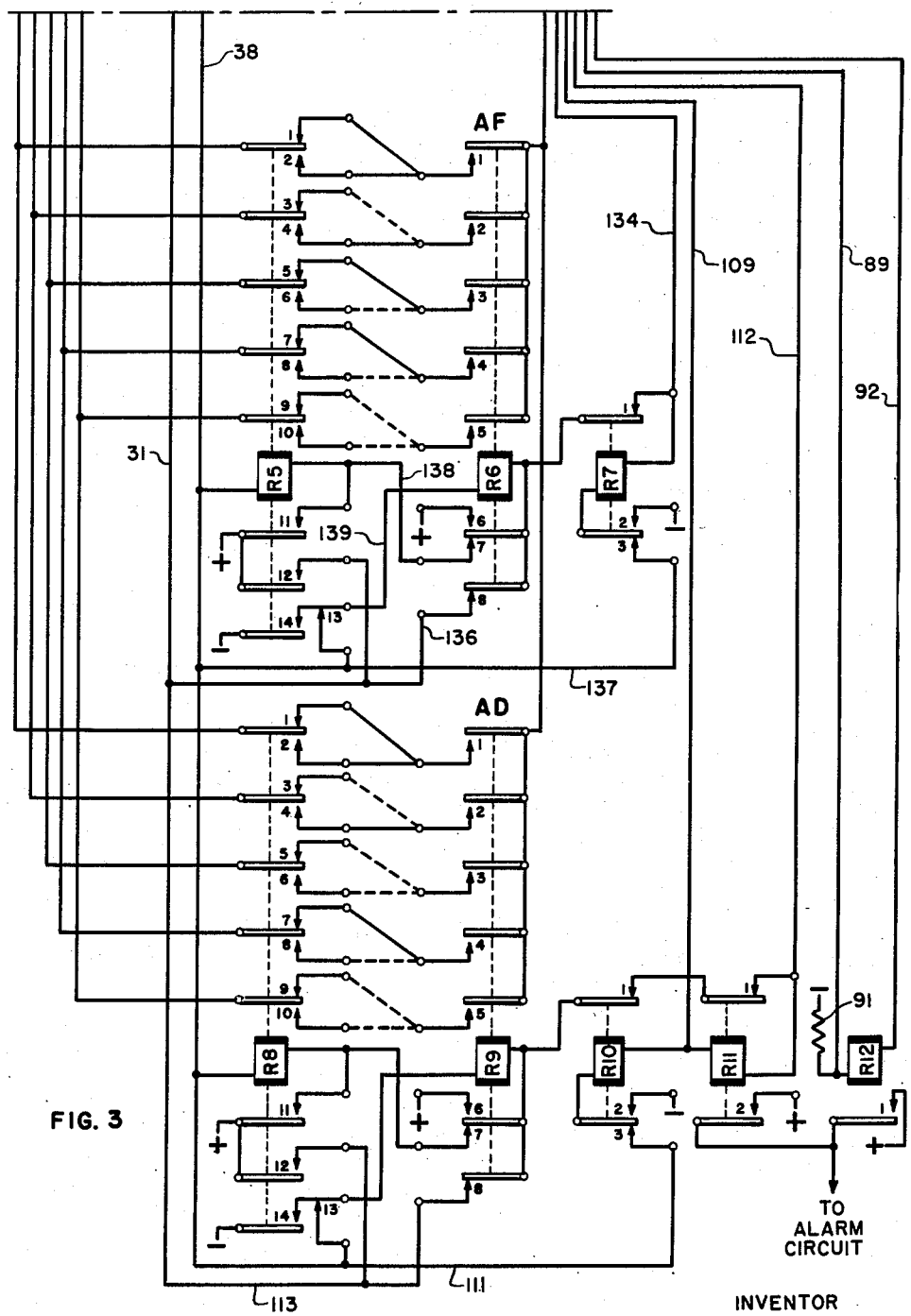
Figure 4:
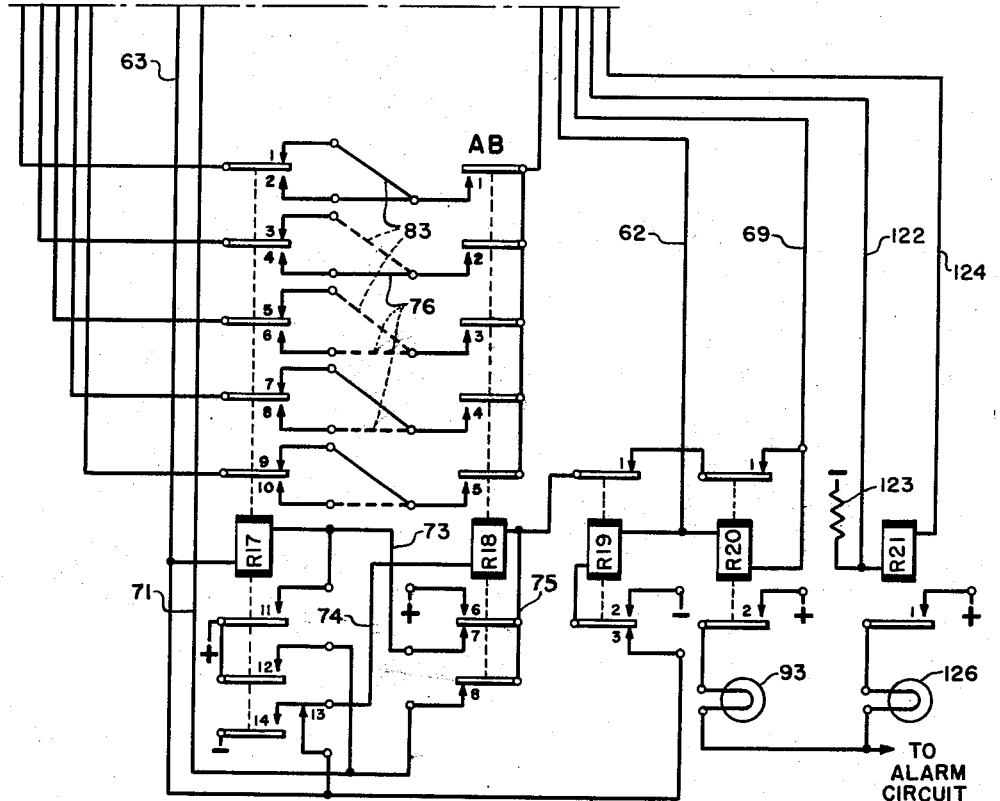
Figure 5:
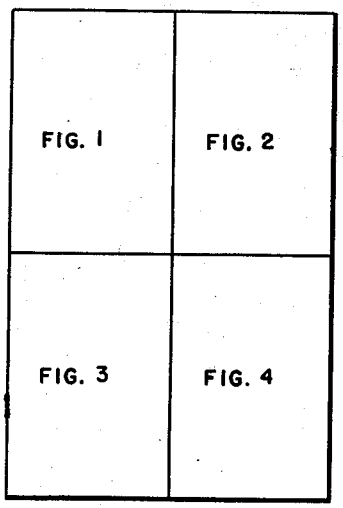
Fig. 5 shows the manner in which Figs. 1-4 should be assembled.

In the drawings Figs. 1 and 3 represent the apparatus and circuits at the control center and Figs. 2 and 4 represent the apparatus at the control tower. The center and the tower are each provided with a selective control unit designated by reference numerals 11 and 12. For a detailed description of these selective control units 11 and 12, reference should be had to the aforementioned patent of W. J. Zenner. It will suffice for the description of the present invention to state that the selective control units 11 and 12 are each provided respectively with a receiving magnet 13 and 14 which are of the type illustrated in Fig. 2 of the Zenner patent and are therein designated by the reference numeral 14. In response to the receipt of specific permutation signals of the Baudot type, which are well known in the printing telegraph art, by the receiving magnets 13 or 14, mechanism in the respective selective control unit is actuated for performing a certain function or closing a certain contact. In the afore-identified Zenner patent, one such contact is depicted in Fig. 5 by the reference numeral 161 and as described in the specification of that patent numerous contact assemblies similar to the contact assembly 161 are provided which are actuated in response to various predetermined series of permutation signals.

The control center and control tower are provided respectivety with conventional telegraph transmitters 16 and 17 for transmitting permutation signals over a line 18 connecting the two offices. It will be understood that the remainder of the mechanism shown in the circuit diagram is duplicated for each other level which is assignable to the aircraft.

When an airplane reaches a certain distance from the landing field the control center operator closes an assign key 19 which corresponds to the level to which the airplane is being assigned. Closure of the assign key 19 completes a circuit from positive battery, through a normally closed contact 21 and armature 22 (the contact 21 and armature 22 being closed whenever a slow-to-close line relay 23 is energized), over a lead 24, through a now closed swinger 26 and contact 27, through the assign key 19 and its associated contact, over a lead 28, through the No. 8 contact of a relay R2, over a lead 29, over a lead 31, through a clutch operating magnet 32 in the transmitter 16, to negative battery. Energization of the magnet 32 causes an operating shaft (not shown) in the transmitter 16 to commence rotating and an auxiliary cam 33, represented schematically in Fig. 7, and mounted on the operating shaft, moves a swinger 34 to a position whereby it makes with a contact 36. When the swinger 34 and contact 36 make in this manner, the circuit to the conductor 28 is extended over two additional paths, namely: From the conductor 28, through the No. 7 contact of the relay R2, over a lead 37, through a relay R1, over a lead 38, through the closed contact 36 and swinger 34 to negative battery; and from the conductor 28, through the R2 relay, over a lead 39, through a back contact 13 of the relay R1 over a lead 41, over the lead 38, through the closed contact 36 and swinger 34, to negative battery.

Energization of the relay R1 causes its contacts Nos. 2, 4, 6, 8, 10, 11, 12, and 14 to close, while energization of the relay R2 causes its contacts Nos. 1-6 to close. When the No. 6 contact of the relay R2 closes, a locking circuit is established for the relay R2 from positive battery, through the closed No. 6 contact of relay R2, through the relay R2, over the lead 39, through the closed No. 14 contact of relay R1, to negative battery. When the No. 7 contact of the relay R2 opens, in response to the energization of the relay R2, the original energizing circuit for the relay R1 is broken; however, by the time that the No. 7 contact of the relay R2 opens, the No. 11 contact of the relay R1 is closed so that the relay R1 is closed and the relay R1 is energized by a locking circuit from positive battery, through the No. 11 contact of the relay R1, over the lead 38, and over through the relay R1, over the lead 38, and over the previously traced circuit to negative battery. Closure of the No. 12 contact of the relay R1, due to the energization of the relay R1, maintains the clutch magnet 32 energized so as to cause the operating shaft (not shown) of the transmitter 16 to continue to rotate.

As the transmitter operating shaft rotates, while the Nos. 1-5 contacts of the relay R2 and Nos. 2, 4, 6, 8, and 10 contacts of the relay R1 are closed, circuits are conditioned from the line 18, over a lead 42, over a lead 43, through the contacts Nos. 1-5 of the relay R2, through straps 44, through the contact Nos. 2, 4, 6, 8, and 10 of the relay R1, over the leads 46, over a group of code wires 47, to a group of transmitting contacts 48, 49, 50, 51, and 52. As the transmitter operating shaft rotates, a series of cams (also not shown) thereon sequentially close the contacts 48, 49, 50, 51, and 52 against the contact 54. The straps 44 shown as solid lines represent connections between the contacts of the relay R2 and of the relay R1, whereas the dotted lines represent broken circuits between the contacts of the relays R2 and R1. The straps 44 which are shown solid, are in circuit with the transmitting contacts 48 and 49, and therefore when the contacts 48—52 are closed sequentially against the contact 54, the line 18 will be closed as contacts 48 and 49 close with contact 54 but open as the contacts 50, 51, and 52 close against the contact 54. This results in the tranmission of a permutation signal over the line 18 consisting of two current impulses followed by three noncurrent impulses. According to the well known Baudot code such as signal is an "A" signal. A contact 55, commonly known as a start-stop contact, is in circuit with the line 18 and normally is closed against the contact 54 to maintain the line 18 in an energized condition. When the transmitter operating shaft rotates, the contact 55 opens from the contact 54 thereby enabling the transmission of the permutation code signal.

Figure 7:
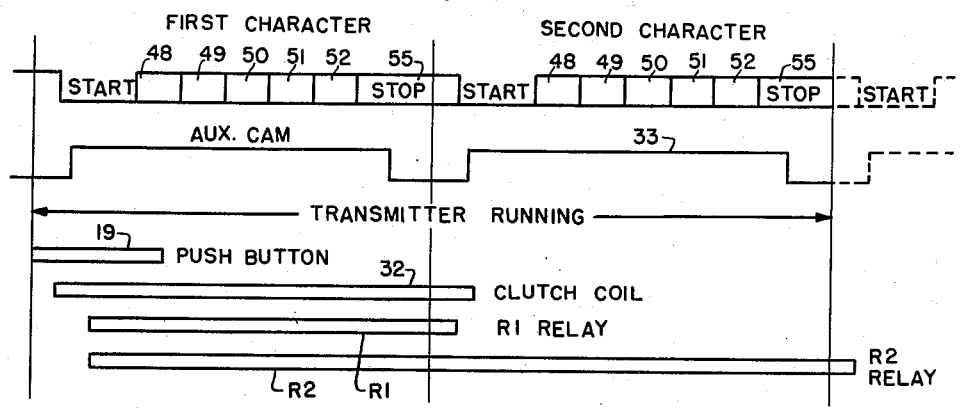
Fig. 7 is a timing diagram of the signal transmitting mechanism.
Figure 6:
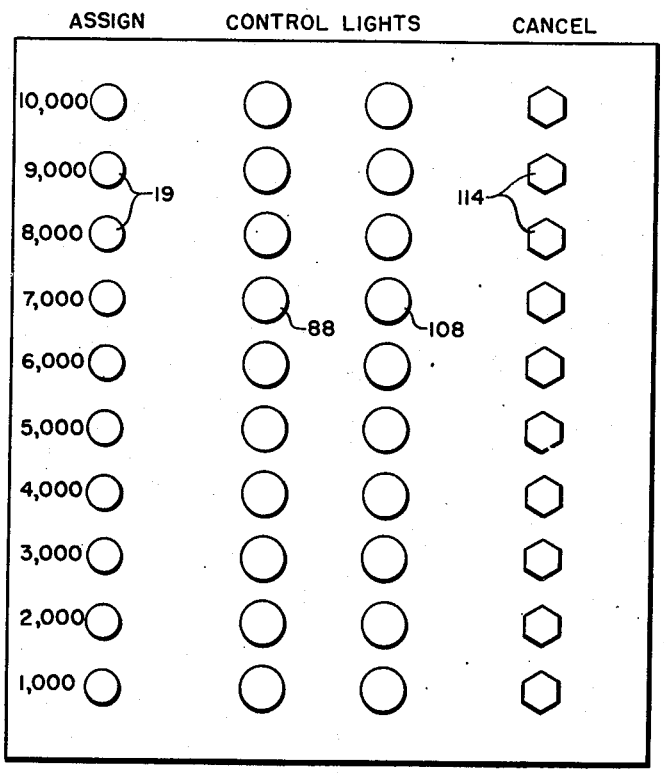
Fig. 6 shows one of the control panels used in the invention.

By reference to Fig. 7 it will be apparent that upon the completion of transmission of the five signal impulses comprising a permutation signal the operating shaft of the transmitter 16 will have nearly completed a revolution, at which time the auxiliary cam 33 functions to move the swinger 34 from engagement with the contact 36. Breaking the circuit between the swinger 34 and the contact 36 breaks the locking circuit to the relay R1 through the No. 11 contact of the relay R1. Upon de-energization of the relay R1 its contacts Nos. 2, 4, 6, 8, 10, 11, 12, and 14 open while its contacts Nos. 1, 3, 5, 7, 9, and 13 close. The relay R1 is a slow to release relay and does not allow its armatures to fall back until the clutch magnet 32 has been energized sufficiently long to start the operating shaft of the transmitter 16 on its next revolution; however, the R1 relay does release its armatures prior to the next closure of the swinger 34 against the contact 36, which is apparent from Fig. 7. When the operating shaft in the transmitter 16 is started it completes a revolution irrespective of the condition of the clutch magnet 32. As is also apparent from Fig. 7 the auxiliary cam 33 closes the swinger 34 against the contact 36 very shortly after the release of the armatures of the relay R1.

The opening of the No. 14 contact of the relay R1 breaks the locking circuit for the relay R2, but at the same time as the No. 14 contact opens, the No. 13 contact of the relay R1 closes. At this time the swinger 34 and contact 36 are open, however the relay R2 is a slow to release relay and before its armatures fall back, the swinger 34 closes against the contact 36 and thereby completes a locking circuit for the relay R2 from positive battery, through the No. 6 contact of the relay R2, over the lead 39, through the No. 13 contact of the relay R1, over the lead 41, over the lead 38, through the closed contact 36 and swinger 34, to negative battery.

The closure of the Nos. 1, 3, 5, 7, and 9 contacts of the relay R1 conditions a new set of circuits to the transmitting contacts 48—52 from the line 18, over the leads 42 and 43, through the closed contacts 1—5 of the relay R2, over a set of straps 55, through the closed contacts 1, 3, 5, 7, and 9 of the relay R1, over the leads 46, over the code wires 47, to the transmitting contacts 48—52. It will be noted that the straps 56 in the circuits between the Nos. 1—5 contacts of the relay R2, and the Nos. 1, 3, 5, 7, and 9 contacts are represented as solid for the first two circuits and as dotted for the last three impulses which results in impressing another "A" signal to the transmitting contacts 48—52. Therefore, as the transmitting shaft rotates through its second revolution an "A" signal is transmitted over the line 18.

In summation thereof, it may be appreciated that the closure of the assign key results in the transmission of the signals "AA" over the line 18. These signals "AA" are indicative of the altitude assigned to a particular aircraft and are the result of the operation of the relays R1 and R2 in controlling the transmitter 16. It is to be understood that similar circuits are provided at both the control center and control tower for controlling aircraft at many other altitudes; for example, if aircraft are to be spaced in 1000 foot increments of altitude, a separate control center is provided at both the control center and tower for each 1000 foot level, hence for controlling aircraft flying from 1000 feet to 1500 feet, 15 circuits are utilized.

The signals "AA" are received by the selector magnet 14 of the control tower selective control unit 12 and in response to these signals, mechanism in the selective control unit 12 causes a double swinger 57 to move to its rightward position to close a contact 58. This movement of the swinger 57 conditions a circuit from positive battery, through the contact 58, over a lead 59, through a red light 61, over a lead 62, through a relay R19, through the closed No. 3 contact of the relay R19, over a lead 63, through a contact 64 and swinger 66, to negative battery. The contact 64 and swinger 66 are similar to the contact 36 and swinger 34 in the transmitter 16, and at the present time are open.

When the swinger 57 moves to the right the circuit through a cancel button 67 is broken at a contact 68, thus making it impossible for the tower to cancel the assignment made by the control center. At the same time that the circuit through the tower red light 61 is conditioned the circuit through the contact 58 and lead 59 is also extended over a lead 69, through the No. 1 contacts of relays R20 and R19, through the No. 8 contact of a relay R18, over a lead 71, through a clutch operating magnet 72 (similar to the clutch operating magnet 32 in the transmitter 16) to negative battery. Upon energization, the magnet 72 releases an operating shaft (not shown) in the transmitter 17 and a cam 33 (Fig. 7) closes the swinger 66 against the contact 64 thereby completing the afore-mentioned circuit through the red light 61 and thereby causing its illumination.

When positive battery is extended to the lead 69, as described above, circuits are also completed for energizing the relays R17 and R18. The energizing circuit for the relay R17 extends from the lead 69, over the No. 1 contacts of the relays R20 and R19, through the No. 7 contact of the relay R18, over a lead 73, through the relay R17, over the lead 63, through the closed contact 64 and swinger 66 to negative battery. The energizing circuit for the relay R18 extends from the lead 69, over the No. 1 contacts of the relays R20 and R19, through the relay R18, over a lead 74, through the No. 13 contact of the relay R17, over the lead 63, through the closed contact 64 and swinger 66 to negative battery. Upon energization, the relay R17 locks up over a circuit from positive battery, through the No. 11 contact of the relay R17, through the R17 relay, over the lead 63, through the closed contacts 64 and swinger 66 to negative battery. Upon energization of both the relays R17 and R18 a locking circuit is established for the relay R18 from positive battery, through the No. 6 contact of the relay R18, over lead 75, through the relay R18, over the lead 74, through the No. 14 contact of the relay R17 to negative battery.

It will be noted that straps 76 connecting the Nos. 1—5 contacts of the relay R18 with the Nos. 2, 4, 6, 8, and 10 contacts of the relay 17 are so arranged that an "A" signal will be impressed to a set of transmitting contacts 77, 78, 79, 80, 81, during the first revolution of the transmitter operating shaft (not shown) in the transmitter 17. A set of straps 83, connecting the Nos. 1—5 contacts of the relay R18 with the Nos. 1, 3, 5, 7, and 9 contacts of the relay R17, are so arranged as to cause a "B" signal to be impressed to the transmitting contacts 77—81. The operation of the relays R17 and R18 and their associated armatures is identical with the operation of the relays R1 and R2 and therefore it is not believed necessary to describe the details further as to how the relays R1 and R2 cooperate with the transmitter 17 to enable transmission of the signals "AB" over the line 18.

Upon illumination of the tower red light 61, that is, when the operating shaft commences rotating in the transmitter 17, the relay R19 becomes energized. Upon energization, the relay R19 pulls up its armatures thereby breaking the circuits through its Nos. 1 and 3 contacts and establishing a locking circuit for itself from negative battery through the No. 2 contact of the relay R19, through the relay R19, over the lead 62, through the red lamp 61, over the lead 59, through the closed contact 58 and swinger 57, to positive battery. The contact swinger 57, when moved to its rightward position, remains in such position until a different special signal combination is received to cause it to move back to its leftward position, and consequently the tower red light 61 remains illuminated until such a special signal is received on the selector magnet 14 of the selective control unit 12.

The signals "AB," transmitted over the line 18 by the transmitter 17, are received by the selector magnet 13 in the selective control unit 11, and in response to the signals a swinger 84 is moved against a contact 86. When the swinger 84 closes against the contact 86 a circuit is completed from positive battery, through the closed swinger 84 and contact 86, over a lead 87, through a green light 88, over a lead 89, through a resistance 91, to negative battery. The green light 88, which is located on the control center display board is thereupon illuminated indicating to the control center that an assignment has been made by the control center for the particular level. If for some reason the green light 88 will not operate, due perhaps to the fact that the light is burned out, a circuit is completed from the lead 87, over a lead 92, through a relay R12, through the resistance 91 to negative battery. The relay R12, upon being energized, pulls up its armature and closes its No. 1 contact thereby completing a circuit from positive battery, through the No. 1 contact of the relay R12 to an alarm (not shown) of any well known type. Whenever the alarm operates the operator is informed that an assignment has been made and that the light is inoperative.

The red light 61 at the tower is also provided with an alarm circuit operable upon failure thereof to illuminate when energized. A high resistance relay R20 is normally shunted out by red light 61, however, if the red light 61 burns out a circuit is established which by-passes the light, from the lead 69, through the relay R20, through the relay R19, through the No. 2 contact of the relay R19, (which contact will be closed at this time) to negative battery. The relay R20, upon being energized, closes its No. 2 contact to thereby complete a circuit from positive battery, through the No. 2 contact of the relay R20, through an alarm light 93, to an alarm of any well known type. The operation of the alarm calls the attention of the operator to the fact that one of the display lamps is inoperative and the light 93 informs him which one is inoperative When the lamp 61 is burned out, the relay R20 is rapid in pulling up its armatures and therefore when its No. 1 contact is opened, the energizing circuit for the clutch magnet 72 is not established for a duration sufficient to permit the start of a rotation of the operating shaft of the transmitter 72. As a consequence the "AB" signal is not transmitted back to the control center and therefore neither the center green light 88, nor the center alarm is operated. The center operator therefore is informed that something is wrong at the control tower and the control tower operator, due to the alarm thereat and also due to the illumination of the lamp 93, also knows that the light 61 is inoperative. The necessary steps will then, of course, be taken to correct the difficulty.

Assuming that the control center has assigned a level to an airplane as previously described and that the tower wishes to take over control of that level, the tower operator then closes an assign key 94 for that particular level. If there are no signals being transmitted over the line 18 at the time when the assign key 94 is closed, a slow-to-close line relay 96 is closed, and a circuit is completed from positive battery through a contact 97; through a pulled up armature 98 of the relay 96, over a lead 99, over a lead 101, through the assign key 94, over a lead 102, through a No. 8 contact of a relay R14, over a lead 103, over the lead 71, through the clutch magnet 72, to negative battery. The energization of the clutch magnet 72 enables the transmitter operating shaft in the transmitter 17 to start rotating and at this time the relays R13 and R14 cooperate with the transmitter 17 to transmit the signals "AC" over the line 18. Since the operation of the relays R13 and R14, in enabling the transmission of the signals "AC" by the transmitter 17, is identical with the operation of the relays R1 and R2 in enabling the transmitter 16 to transmit the signals "AA," the details of the operation of the relays R13 and R14 will not be described. It should be noted the Nos. 1—5 contacts of the relay R14 are strapped to the Nos. 1—10 contacts of the relay R13 in a manner such that the transmitter 17 transmits the signals "AC" upon the operation of the relays R13 and R14.

The signals "AC" are received by the selector magnet 13 at the control center and actuate the selective control unit 11 in a manner whereby the swinger 84 is moved to its leftward position (as shown) to thereby break the circuit to the green light 88 at the control center. Also in response to the signals "AC" a contact swinger 104 is moved to its rightward position in engagement with a contact 106 and this conditions a circuit from positive battery, through the swinger 104 and contact 106, over a lead 107, through a red light 108 (corresponding to the same level as that of the green light 88), over a lead 109 through the relay R10, through the No. 3 contact of the relay R10, over a lead 111, over the lead 38, through the contact 36 and swinger 34 (presently open), to negative battery. Another circuit is established at this time when positive battery is extended through the swinger 104 and contact 106, over the lead 107, over a lead 112, through the No. 1 contact of a relay R11, through the No. 1 contact of a relay R10, through the No. 8 contact of a relay R9, over a lead 113, over the lead 31, through the clutch magnet 32, to negative battery. Energization of the clutch magnet 32, as usual, starts the transmitter operating shaft rotating, whereupon the swinger 34 closes against the contact 36 to thereby complete the energizing circuit for the red light 108. When the clutch magnet 32 is energized the relays R8 and R9 are also energized, in the manner already described with reference to the relays R1 and R2. The Nos. 1—5 contacts of the relay R9 and the Nos. 1—10 contacts of the relay R8 are so strapped as to enable the transmission of the signals "AD" by the transmitter 16 during the operation of the relays R8 and R9.

Upon completion of the circuit through the lamp 108, the relay R19 pulls its armatures and establishes a locking circuit for the red light 108 from positive battery, through the closed swinger 104 and contact 106, over the lead 107, through the red light 108, over the lead 109, through the relay R10, through the No. 2 contact of the relay R10, to negative battery.

When the signals "AC" are received by the selective control unit 11, the swinger 26 also is actuated in response thereto and caused to move to its rightward position This movement of the swinger 26 breaks the circuits to the assign key 19 and to a cancel key 114 at the control center thus making it impossible for the control center to gain control of the level at this time.

If the red light 108 is burned out a circuit is established from positive battery, through the closed swinger 104 and contact 106, over the lead 107, over the lead 112, through a high resistance relay R11, through the relay R10, through the No. 3 contact of the relay R10, over the lead 111, over the lead 38, through the closed contact 36 and swinger 34, to negative battery. When the relay R10 becomes energized and pulls up its armatures it closes its No. 2 contact to thereby complete an obvious locking circuit for itself and for the relay R11. The relay R11, upon being energized opens its No. 1 contact and closes its No. 2 contact. Opening of the No. 1 contact of the relay R11 breaks the initial energizing circuit to the clutch magnet 32 to thereby prevent successive rotations of the transmitter operating shaft of the transmitter 16 after the transmission of the signals "AD". Closure of the No. 2 contact of the relay R11 completes an obvious circuit to an alarm to thereby warn the center operator that the light is inoperative.

The "AD" signal, upon being transmitted over the line 18 is received by the selector magnet 14 at the tower. In response to this "AD" signal a swinger 116 is caused to move to the right against a cooperating contact 117 to thereby complete a circuit from positive battery, over a lead 118, through the swinger 116 and contact 117, over a lead 119, through a green light 121, over a lead 122, through a resistance 123, to negative battery. Normally the green light 121 is illuminated at this time; however, if it is burned out a circuit is established from the lead 119, over a lead 124, through a high resistance relay R21, through the resistance 123, to negative battery. When the green light 121 illuminates, the circuit through the relay R21 is shunted out. Upon energization of the relay R21 it closes its No. 1 contact and thereby completes a circuit from positive battery through the No. 1 contact of the relay R21, through an alarm light 126, to a circuit connected to an alarm (not shown). Thus, when the green light 121 fails to illuminate the alarm attracts the attention of the tower operator and the alarm light 121 informs the operator which green light is not functioning.

Also, when the selector magnet 14 receives the signals "AD," the double swinger 57 in the selective control unit 12 is caused to move to its leftward position (as shown) thereby extinguishing the red light 61 and conditioning the circuit to the cancel button 67. At this time the tower controls the assigned level, and assuming that the lights are functioning properly this fact is clearly indicated at both the control center and control tower due to the illumination of the red light 108 at the control center and of the green light 121 at the control tower.

As a plane descends during its landing procedure it leaves its assigned level and the tower operator cancels the assignment by actuating the tower cancel button 67 for that particular level. Under the existing condition of the circuits, depression of the tower cancel button completes a circuit from positive battery, through the closed contact 97 and swinger 98 (closed when there is no transmission taking place over the line 18 to cause the de-energization of the relay 96), over the lead 99, through the double swinger 57 and contact 68, through the cancel button 67 and its operating contact, over a lead 127, through the No. 8 contact of the relay R16, over a lead 128, over the lead 71, through the magnet 72, to negative battery. As soon as the clutch magnet 72 releases for rotation the operating shaft in the transmitter 17, the cam 33 on the operating shaft closes the swinger 66 against the contact 64 and completes momentary circuits for the relays R15 and R16 extending from the lead 127, through the No. 7 contact of the relay R16, over a lead 129, through the relay R15, over the lead 63, through the closed contact 64 and swinger 66 to negative battery; and also from the lead 127, through the relay R16, over a lead 131, through the No. 13 contact of the relay R15, over a lead 132, over the lead 63, through the closed contact 64 and swinger 66 to negative battery. The Nos. 1—10 contacts of the relay R15 are so strapped to the Nos. 1—5 contacts of the relay R16 as to enable the impression of the signals "AE" to the transmitting contacts 77—81. When the relays R15 and R16 are energized, the transmitter 17 cooperates therewith in the identical manner that the transmitter 16 cooperates with the relays R1 and R2, in order to enable the transmission of the signals "AE" over the line 18.

The signals "AE" are received by the selector magnet 13 and cause the swinger 26 to move to its leftward position (as shown) and also cause the swinger 104 to move to its leftward position (as shown) into engagement with a contact 133. Restoration of the swinger 26 to its leftward position against the contact 27 enables the control center to again assign the particular level to another plane. Restoration of the swinger 104 to its leftward position against the contact 133, breaks the circuit to the red light 108, and completes a circuit from positive battery through the swinger 104 and contact 133, over a lead 134, through the No. 1 contact of the relay R7, through the No. 8 contact of the relay R6, over a lead 136, over a lead 31, through the clutch magnet 32 to negative battery. The transmitter operating shaft in the transmitter 16 starts to rotate at this time and upon closure of the swinger 34 against the contact 36 by the auxiliary cam 33, a circuit is extended from the lead 134, through the relay R7, through the No. 3 contact of the relay R7, over a lead 137, over the lead 38, through the closed contact 36 and swinger 34, to negative battery. The relay R7 is slow to operate, and at this same time a circuit is also established from the lead 134, through the No. 1 contact of the relay R7, through the No. 7 contact of the relay R6, over a lead 138, through the relay R5, over a lead 38, through the closed contact 36 and swinger 34, to negative battery; and another circuit from the lead 134 is established, through the No. 1 contact of the relay R7, through the relay R6, over a lead 139, through the No. 13 contact of the relay R5, over the lead 137, over the lead 38, through the closed contact 36 and swinger 34, to negative battery. The Nos. 1—10 contacts of the relay R5 and the Nos. 1—5 contacts of the relay R6 are strapped together in a manner to enable the relays R5 and R6 to cooperate with the transmitter 16 to transmit the signals "AF." The relay R7, being slow to operate, does not pull up its armatures until after the transmission of the signals "AF." The relay R7 is necessary in order to prevent transmission of more than a single sequence of the signals "AF," as the swinger 104 and contact 133 remain closed when closed in response to the signals "AE." When the relay R7 pulls up its armatures its No. 1 contact and No. 3 contact are opened which breaks the circuits to the relays R5 and R6, and its No. 2 contact is closed thereby completing its own locking circuit from the lead 134, through the relay R7, through the No. 2 contact of relay R7, to negative battery.

Upon receipt of the signals "AF" by the selector magnet 14, the swinger 116 in the selective control unit 12 is moved to the left (the position shown) which opens the circuit through the swinger 116 and contact 117. Breaking of this circuit de-energizes the green light 121 and therefore all lights are extinguished for the particular level and all circuits for such level are in condition for a new assignment of a plane to that level.

When an airplane merely flies through the area controlled by the control center and does not land at the airport within the area it becomes necessary that the center be able to assign an altitude to the plane and later, when the plane leaves the control zone, to cancel the assignment. This is accomplished in the following manner:

The plane is assigned an altitude as before described, at which time the control center operator depresses his assign key 19 corresponding to that level. The center equipment transmits the signals "AA" over the line 18, as before, such signals being received by the selector magnet 14 at the tower. The tower red light 61 is illuminated in response to the signals "AA" and the tower transmitter 17 is caused to transmit the signals "AB" over the line 18. The "AB" signals cause the illumination of the center green light 88. Control over the plane belongs to the control center which retains control thereover until the plane leaves the controlled area.

At the time when the plane leaves the area, the center operator depresses th cancel button 114 for the particular level which (assuming that no signals are being transmitted over the line 18 at this time) completes a circuit from positive battery, through the contact 21 and swinger 22, over the lead 24, through the closed swinger 23 and contact 26, through the cancel button 114, over a lead 141, through the No. 8 contact of the relay R4, over a lead 142, over the lead 31, through the clutch magnet 32, to negative battery. The operating shaft of the transmitter 16, being actuated upon the energization of the clutch magnet 32, causes the cam 33 to close the swinger 34 against the contact 36, thereby completing energizing circuits for the relays R3 and R4. The energizing circuit for the relay R3 extends from the lead 141, through the No. 7 contact of the relay R4, over a lead 143, through the relay R3, over the lead 38, through the closed contact 36 and swinger 34, to negative battery. The energizing circuit for the relay R4 extends from the lead 141, through the relay R4, over a lead 144, through the No. 13 contact of the relay R3, over the lead 38, through the closed contact 36 and swinger 34, to negative battery. The Nos. 1—10 contacts of the relay R3 are strapped to the Nos. 1—5 contacts of the relay R4 so as to enable the transmitter 16 to transmit the signals "AG" over the signal line 18 at this time, in the same manner as the relays R1 and R2 cooperate with the transmitter 16 to transmit the signals "AA."

The signals "AG" are received on both selector magnets 13 and 14. In response to the "AG" signals the swinger 84 in the selective control unit 11 moves to the left (the position shown) thereby breaking the circuit to the center green light 88. The "AG" signals also cause the swinger 104, in the center selective control unit 11, to move to the right to complete the heretofore traced circuits to the center red light 108 and to the relays R8 and R9. The relays R8 and R9 operate in the same manner, as described before, in cooperation with the transmitter 16 to cause transmission of the signals "AD" over the signal line 18.

When the selector magnet 14 in the tower selective control unit 12 receives the signals "AG" immediately followed by the signals "AD" a swinger 146 is moved to the right momentarily to engage a contact 147. This completes a circuit from positive battery, over the lead 118, through the closed swinger 146 and contact 147 over a lead 148, over the lead 127, through the No. 8 contact of the relay R16, over the lead 128, over the lead 71, through the clutch magnet 72, to negative battery. Upon the start of rotation of the transmitter operating shaft in the transmitter 17, the cam 33 closes the swinger 69 against the contact 64, thereby completing momentary circuits to the relays R15 and R16. The relays R15 and R16 then cooperate with the transmitter 17 in the manner hereinbefore described to enable the transmitter 17 to transmit the signals "AE" over the line 18.

The "AD" signals of the "AG—AD" combination also cause the double swinger 57 to move to the left to restore the tower cancel button 67 to operable condition, and to break the circuit to the tower red light 61. The "AD" signals also cause the swinger 116 to move to the right to cause illumination of the tower green light 121 in the manner also hereinbefore described.

The "AE" signal combination, transmitted over the line 18 by the transmitter 17, due to the co-operation of the relays R15 and R16, is received by the center selector magnet 13 and causes the swinger 104 in the selective control unit 11, to move to the left thereby breaking its connection with the contact 106 and making with the contact 133. When the circuit through the swinger 104 and contact 106 is broken the center red light 108 is extinguished and the locking circuit for the relays R10 and R11 is broken which restores these relays to their normal de-energized condition. When the swinger 104 engages the contact 133 a circuit is extended from positive battery, through the swinger 104 and contact 133, and over the lead 134 to the relays R5, R6, and R7. These relays cooperate with the transmitter 16 in the manner already described to cause transmission of the signals "AF" over the line 18. The "AF" signals are received by the selector magnet 14 and cause the swinger 116 in the selective control unit 12 to move to the left to break the obvious circuit to the tower green light in the manner already described. Therefore at this time all lights for the particular level are restored to normal extinguished condition.

When a plane under the control of the tower descends to a lower level, as in the case of a landing operation, it is necessary that the tower be able to assign the plane to the new altitude. This is accomplished in the following manner.

The operation whereby the tower operator cancels the assignment of an assigned level has already been described. When the tower operator wishes to assign a new level to an airplane, he depresses the assign button 94 corresponding to the level which is to be assigned. This completes a circuit from positive battery, through the contact 97 and armature 98, over the lead 99, through the assign button 94, over the lead 102, to the relays R13 and R14, and to the clutch magnet 72. The relays R13 and R14 cooperate with the transmitter 17 in the usual manner to transmit the signals "AC" over the line 18. The "AC" signals are received by the control center selector magnet 13 and cause illumination of the red light 108 for the new level and initiate transmission of the signals "AD" by the transmitter 16 under the control of the relays R8 and R9. The signals "AD" are received by the selector magnet 14 in the tower selective control unit 12 and cause illumination of the tower green light 121. At this time a new level has been assigned and, as is indicated by the condition of the lights, is under the control of the tower.

When the signals "AC" were received by the center selector magnet 13, the swinger 26 also moved to the right, thereby cutting out the cancel button 114 and assign button 19 at the center. Thus it is impossible for the center to cancel an assignment made by the tower. The tower, however, can cancel this new assignment, as the "AD" signals transmitted from the center cause the double swinger 57 in the tower selective control unit 12 to move to the left. As is obvious, when the double swinger 57 is closed with the contact 68, the tower cancel button 67 is operable.

In the above description of the invention and in the drawings, only the control circuits for transmitting signals indicative of a single altitude are shown and described. It will be remembered that in practicing the invention there are provided substantial duplicates of these control circuits for each altitude to which it is desired to assign airplanes. Also in actual practice of the present invention the "A" series of signals, which has been described, is used for only one level, whereas the signals for other levels might be a "B," "C," etc. series of signals. To change from the "A" series of signals merely involves changing the strappings between the control contacts of each pair of control relays, such as R1 and R2. The selective control units would have swingers and contacts for each level like those shown, but the swingers would respond only to signals which control mechanism associated with the particular level.

It is contemplated that numerous changes and modifications may be made in the invention without departing from the scope thereof.

What is claimed is:

1. In an aircraft altitude control system, a pair of control stations, an indicator board at each of said stations having a pair of different colored lights corresponding to each altitude at which aircraft may be assigned, means at each of said stations for assigning an altitude to an aircraft including means for transmitting a series of permutative signal impulses to the other station indicative of the assigned altitude, means at said other station responsive to said series of permutative signal impulses for illuminating one of said colored lights corresponding to the assigned altitude on the indicator board at said other station, other means at said other station responsive to said series of permutative signal impulses for transmitting a second series of permutative signal impulses to said first station, and means at said first station responsive to said second series of permutative signal impulses for illuminating the light of the other color corresponding to the assigned altitude on the indicator board at said first station.

2. In an aircraft altitude control system, a pair of control stations, an indicator board at each of said stations having a pair of different colored lights corresponding to each altitude at which aircraft may be assigned, means at each of said stations for assigning an altitude to an aircraft including means for transmitting a series of permutative signal impulses to the other station indicative of the assigned altitude, means at said other station responsive to said series of permutative signal impulses for illuminating one of said lights corresponding to the assigned altitude on the indicator board at said other station, other means at said other station responsive to said series of permutative signal impulses for transmitting a second series of permutative signal impulses to said first station, means at said first station responsive to said second series of permutative signal impulses for illuminating the light of the other color corresponding to the assigned altitude on the indicator board at said first station, said station having the light of said other color displayed thereat having control of the assigned altitude, and means operable at said station displaying the light of said other color for canceling the assignment and extinguishing all lights for the assigned altitude.

3. In an aircraft altitude control system, a pair of control stations, an indicator board at each of said stations having lights corresponding to each altitude at which aircraft may be assigned, means at each of said stations for assigning an altitude to an aircraft including means for transmitting a signal to the other station indicative of the assigned altitude, means at said other station responsive to said signal for illuminating the light corresponding to the assigned altitude, alarm means at each of said stations, and normally ineffective means at each of said stations for actuating said alarm means rendered effective in response to said signal upon a failure of the light corresponding to the assigned altitude.

4. In an aircraft altitude control system, a pair of control stations, an indicator board at each of said stations having lights corresponding to each altitude at which aircraft may be assigned for indicating an assigned altitude, means at each of said stations for assigning an altitude to an aircraft including means for transmitting a signal to the other station indicative of the assigned altitude, an indicator circuit for each of said lights, means at said other station responsive to said signal for actuating the indicator circuit of the light corresponding to the assigned altitude, alarm means for indicating a failure of said lights to indicate the assigned altitude, and means controlled by the reception of a signal and the resistance of said indicator circuit of the light corresponding to the assigned altitude for controlling said alarm means.

5. In an aircraft altitude control system, a control center having a signal transmitter thereat, a control tower having a signal transmitter thereat, a separate selective receiving apparatus at both the control center and tower, a plurality of pairs of control circuits adapted to be permutatively connected to the center transmitter, a second plurality of pairs of control circuits adapted to be permutatively connected to the tower transmitter, a signalling channel interconnecting the transmitters and selective receiving apparatus, means at the center for selecting and successively connecting one pair of the center pairs of control circuits to the transmitter and for simultaneously initiating operation of said transmitter to transmit over said signalling channel a pair of signals as determined by the permutative connections of said pair of center control circuits, means actuated by the reception of said center pair of signals at the tower selective receiving apparatus for selecting and successively connecting one of said pairs of tower control circuits to said tower transmitter and for simultaneously initiating operation of said tower transmitter to transmit over said signalling channel a pair of signals as determined by the permutative connection of said pair of tower control circuits, and means at both the control center and tower operated by the respective selective receiving apparatuses for indicating reception of a pair of signals by the particular selective receiving apparatus.

6. In an aircraft altitude control system, a control center having a signal transmitter thereat, a control tower having a signal transmitter thereat, a pair of control circuits adapted to be permutatively connected to said center transmitter, a second pair of control circuits adapted to be permutatively connected to said tower transmitter, each of said control circuits being adapted to control the transmitter to transmit a permutative series of signal impulses in accordance with the permutative connection of the control circuits, means at the control center for sequentially connecting each of the center control circuits to said center transmitter, means operated by said last mentioned means for initiating the operation of said center transmitter to transmit two series of permutative signal impulses, means at said control tower responsive to said two series of permutative impulses for sequentially connecting each of the tower control circuits to said tower transmitter, means operating by said last-mentioned means for initiating operation of said tower transmitter to transmit two series of permutative signal impulses, indicator means at both the control center and tower, and means operated by the reception of said series of signal impulses at both the control center and tower for actuating each of said indicator means.

7. In an aircraft altitude control system, a control center having a signal transmitter thereat, a control tower having a signal transmitter thereat, a selective control unit responsive to permutative signals at both the control center and tower, a single signalling channel interconnecting the signal transmitters and selective control units, a plurality of permutatively different control circuits adapted to be permutatively connected to the control center signal transmitter, a plurality of permutatively different control circuits adapted to be permutatively connected to the control tower signal transmitter, means at the control center for selecting a predetermined one of control center control circuits and connecting said selected circuit to the control center signal transmitter, said means also initiating operation of said signal transmitter to transmit a signal in accordance with the permutative connection of its control circuit, means operated by the reception of the signal at the control tower selective control unit for connecting a predetermined one of the control tower control circuits to the control tower signal transmitter, said last mentioned means also initiating operation of the control tower signal transmitter to transmit a signal in accordance with the permutative connection of its control circuit, indicator means at both the control center and tower actuated by reception of signals at each of the selective control units, means at said control tower for connecting another of said control tower control circuits to the control tower signal transmitter, said last mentioned means initiating operation of said control tower signal transmitter to transmit a signal in accordance with the permutative connection of its control circuit, means operated by the reception of the signal at the control center selective control unit for connecting another of said plurality of control center control circuits to the control center signal transmitter, said last mentioned means initiating operation of said control center signal transmitter to transmit a signal in accordance with the permutative connection of its control circuit, and additional indicator means operated by the reception of these last mentioned signals at each of the selective control units.

8. In an aircraft altitude control system, a pair of control stations, an indicator board at each of said stations having a light of a first color and a light of a second color, means at each station for transmitting a first series of permutative signal impulses to the other station, means at said other station responsive to said first series of permutative signal impulses for illuminating the light of the first color, means at said other station also responsive to the reception of said first series of permutative signal impulses for transmitting a second series of permutative signal impulses to said first station, means at said first station responsive to said second series of permutative signal impulses for illuminating the light of the second color, means at the station displaying the light of the second color for transmitting a third series of permutative signal impulses to said other station, means responsive to said third series of permutative signal impulses for extinguishing the light of the first color, means at said other station responsive to the reception of the third series of permutative signal impulses for transmitting a fourth series of permutative impulses, and means at said first station responsive to said fourth series of permutative signal impulses for extinguishing said light at the second color.

9. In a telegraph control system, a first station having a telegraph transmitter thereat, a second station having a telegraph transmitter thereat, a pair of control circuits adapted to be connected to the transmitter at the first station, a pair of control circuits adapted to be connected to the transmitter at the second station, a relay for controlling which control circuit is to be connected to the transmitter at the first station, a relay for controlling which control circuit is to be connected to the transmitter at the second station, means at the first station for energizing the relay thereat to connect a first one of the control circuits to the transmitter to cause the transmitter to generate a first series of impulses indicative of the connected control circuit, means operated by the transmitter for releasing the relay at the first station to connect the second control circuit of the pair thereat to the transmitter to cause the transmitter to generate a second series of impulses indicative of the connected control circuit, means at the second station responsive to the reception of both series of impulses for energizing the relay at the second station to connect a first control circuit of the pair to the transmitter thereat, said means being also effective to initiate the transmitter at the second station into operation to generate a first series of impulses as determined by the control circuit connected thereto, and means controlled by the transmitter at the second station for de-energizing the relay to connect the second control circuit of the pair to the transmitter to cause the transmitter to generate a second series of impulses as determined by the control circuit connected thereto.

10. In a telegraph control system, a first station having a transmitter thereat, a plurality of first control circuits associated with the first transmitter, a first selective control unit associated with the first control circuits, a second station having a transmitter thereat, a plurality of second control circuits associated with the second transmitter, a second selective control unit associated with the second control circuits, means for manually operating the first selective control unit to select and connect a predetermined one of the first control circuits to the first transmitter, means operated by the first selective control unit for initiating the first transmitter into operation to transmit a first signal as determined by the control circuit connected thereto, said second selective control unit adapted to respond to said first signal to select and connect a predetermined one of the second control circuits to the second transmitter, means operated by the second selective control circuit for initiating the second transmitter into operation to transmit a second signal as determined by the control circuit connected thereto, means for manually operating the second selective control unit to select and connect a predetermined one of the second control circuits to the second transmitter, means operated by the second selective control unit for initiating the second transmitter into operation to transmit a third signal as determined by the control circuit connected thereto, said first selective control unit adapted to respond to said third signal to select and connect predetermined ones of the first control circuits to the second transmitter, means operated by the first selective control unit for initiating the first transmitter into operation to transmit a fourth signal as determined by the control circuit connected thereto, means for precluding the operation of the manual means at the second station when the manual means at the first station is operated, and means for precluding the operation of the manual means at the first station when the manual means at the second station is operated.

11. In a telegraph control system, a first station having a telegraph transmitter thereat, a plurality of permutative control circuits associated with the transmitter at the first station, a second station having a telegraph transmitter thereat, a plurality of permutative control circuits associated with the transmitter at the second station, means for selecting and connecting one of the circuits at the first station to the associated transmitter, means operated by the selecting means for initiating the connected transmitter into operation to transmit a first permutative signal as determined by the permutative connection of the first control circuit, means at the second station responsive to said first signal for selecting and connecting a permutative control circuit to the transmitter located thereat, means at the second station actuated by the selecting means for indicating the reception of said first signal, means operated by the selecting means for initiating said transmitter into operation to transmit a second permutative signal as determined by the permutative connection of the control circuit, means at the first station responsive to said second signal for indicating the reception of the second signal, means at the first station for selecting another of the control circuits and permutatively connecting it to the associated transmitter, means actuated by said selecting means for initiating the transmitter into operation to transmit a third signal as determined by the permutative connection of the control circuit, said selective means at the second station disrupting the indicating means upon reception of the third signal, said selecting means also connecting another of the permutative control circuits to the transmitter, means operated by the selecting means at the second station for initiating the transmitter into operation to transmit a fourth signal as determined by the permutative connection of the control circuit, said selective means at the first station disrupting the indicating means thereat upon reception of the fourth signal.

FRANK MARTINDELL.

References Cited in the file of this patent

UNITED STATES PATENTS

| Number | Name | Date |
|---|---|---|
| Re. 20,462 | Kleinschmidt | Aug. 3, 1937 |
| 1,616,186 | Harlow | Feb. 1, 1927 |
| 1,620,704 | Vencill | Mar. 15, 1927 |
| 2,216,610 | Culbertson | Oct. 1, 1940 |
| 2,268,240 | Brixner | Dec. 30, 1941 |
| 2,344,760 | Wight et al. | Mar. 21, 1944 |
| 2,425,973 | Wight et al. | Aug. 19, 1947 |
| 2,529,596 | Coley | Nov. 14, 1950 |